United States Patent
Kimura

(10) Patent No.: US 8,193,739 B2
(45) Date of Patent: Jun. 5, 2012

(54) APPARATUS FOR LIGHTING LEDS

(75) Inventor: Kengo Kimura, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 407 days.

(21) Appl. No.: 12/549,615

(22) Filed: Aug. 28, 2009

(65) Prior Publication Data

US 2010/0052552 A1    Mar. 4, 2010

(30) Foreign Application Priority Data

Sep. 1, 2008  (JP) .................................. 2008-223373

(51) Int. Cl.
 *H05B 37/00*  (2006.01)
(52) U.S. Cl. .................... 315/307; 315/185 R; 315/192; 315/308; 315/291
(58) Field of Classification Search .................. 315/291, 315/185 R, 186, 187, 193, 191, 294, 295, 315/307, 308
See application file for complete search history.

(56) References Cited

U.S. PATENT DOCUMENTS

| | | | | |
|---|---|---|---|---|
| 7,893,626 | B2* | 2/2011 | Liu | 315/185 R |
| 7,902,771 | B2* | 3/2011 | Shteynberg et al. | 315/307 |
| 8,018,170 | B2* | 9/2011 | Chen et al. | 315/192 |
| 2007/0024213 | A1* | 2/2007 | Shteynberg et al. | 315/291 |
| 2008/0048573 | A1* | 2/2008 | Ferentz et al. | 315/193 |
| 2009/0230891 | A1* | 9/2009 | Zhao et al. | 315/308 |

FOREIGN PATENT DOCUMENTS

JP    2003-332624    11/2003

* cited by examiner

*Primary Examiner* — Shawki S Ismail
*Assistant Examiner* — Christopher Lo
(74) *Attorney, Agent, or Firm* — Oblon, Spivak, McClelland, Maier & Neustadt, L.L.P.

(57) ABSTRACT

An apparatus for lighting LEDs includes an LED group load having the LEDs, a converter to generate a voltage applied to the LED group load, a current controller to control a current of the LED group load, a voltage controller to control an output voltage provided by the converter, a time division circuit to intermittently pass a current through the LED group load, and a selector. The selector, during a period in which the time division circuit passes a current through the LED group load, selects the current controller to control a current of the LED group load and thereby control an output voltage provided by the converter, and during a period in which the time division circuit passes no current through the LED group load, selects the voltage controller to control an output voltage provided by the converter.

4 Claims, 4 Drawing Sheets

(a) TIME DIVISION SIGNAL
(b) LED CURRENT
(c) CONVERTER OUTPUT VOLTAGE — VOLTAGE FLUCTUATION (VOLTAGE DROP)

(a) TIME DIVISION SIGNAL
(b) LED CURRENT — JUMP
(c) CONVERTER OUTPUT VOLTAGE

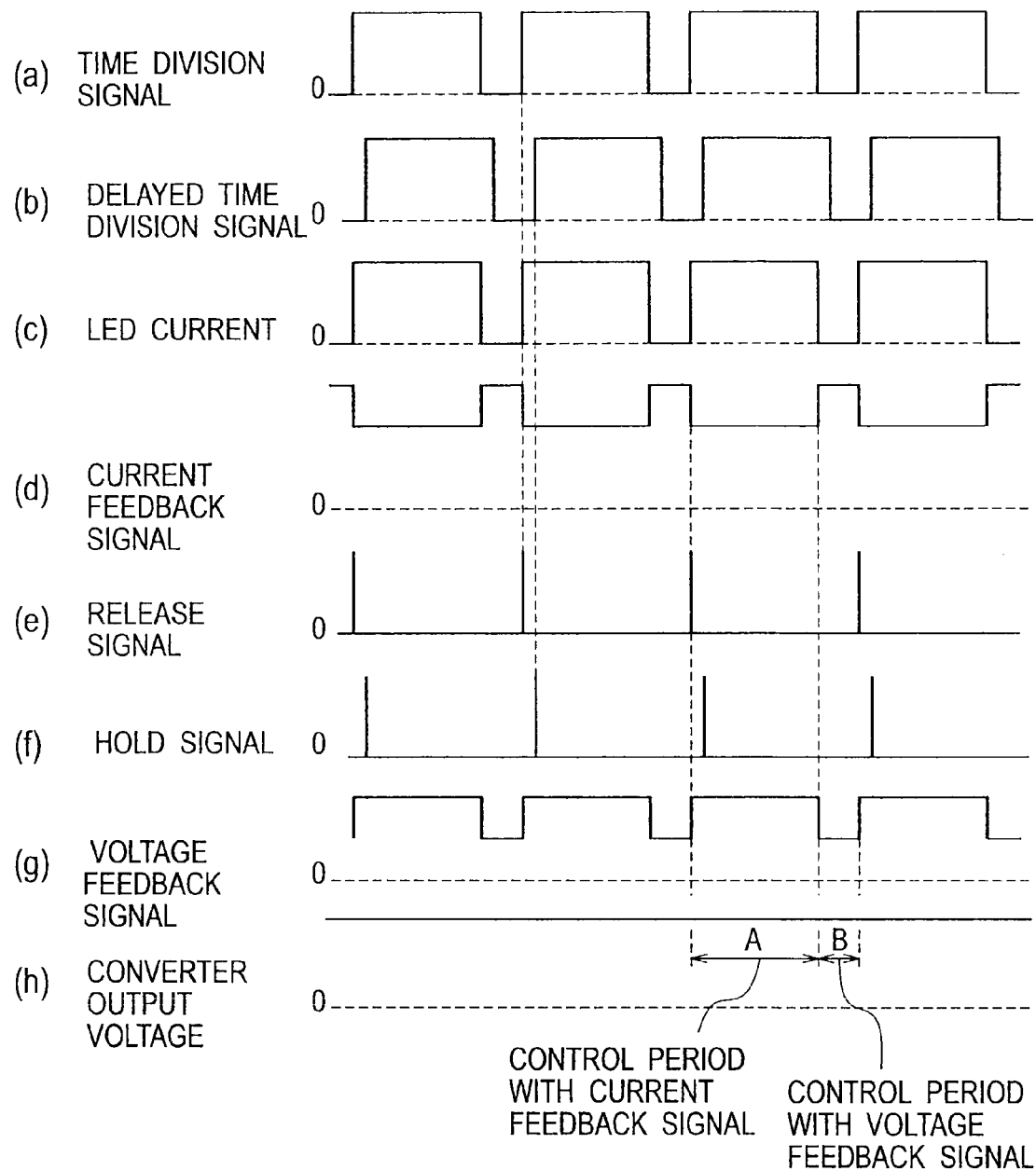

APPARATUS FOR LIGHTING LEDS

BACKGROUND OF THE INVENTION

1. Field of the Invention

The present invention relates to an apparatus for lighting LEDs (Light Emitting Diodes) used as, for example, a backlight for a liquid crystal display.

2. Description of the Related Art

An example of an apparatus for lighting LEDs is disclosed in, for example, Japanese Unexamined Patent Application Publication No. 2003-332624. This related art lights groups of series-connected LEDs with a voltage that is set to be always lower than a power source voltage irrespective of the number of the groups of series-connected LEDs, thereby enabling the use of low-withstand-voltage ICs and reducing a power loss.

FIG. 1 illustrates the apparatus according to the above-mentioned related art. The apparatus includes drivers 12 to 14 that turn on/off in response to time division signals S1 to S3. First ends of the drivers 12 to 14 are connected to terminals P23 to P25 that are connected to LEDs 21 to 26. The drivers 12 to 14 are connected in parallel with bypass units 15 to 17 that pass currents when the drivers 12 to 14 are OFF, the currents passed through the bypass units 15 to 17 being of such levels not to light the LEDs 21 to 26. A selector 18 selects one of drain-source voltages of the drivers 12 to 14, or one of currents passed through lines of the LEDs 21 to 26.

In a period to light the LEDs 21 to 26, the drivers 12 to 14 pass necessary currents to the LEDs 21 to 26, and in a period to turn off the LEDs 21 to 26, the drivers 12 to 14 stop the currents and the bypass units 15 to 17 pass minute currents to prevent an output voltage from a converter 27 from jumping.

SUMMARY OF THE INVENTION

Needs for low-profile backlights are increasing in recent years. To meet the needs, apparatuses for lighting LEDs that serve as backlights frequently employ chip parts. The apparatuses for lighting LEDs are mostly arranged at the backs of liquid crystal panels, and therefore, employ low-profile chip ceramic capacitors. The same electric characteristics as those provided by the chip ceramic capacitors may be provided by electrolytic capacitors or film capacitors.

The electrolytic capacitors, however, increase board thickness and the film capacitors heighten cost, and therefore, the chip ceramic capacitors have the preference.

The related art illustrated in FIG. 1 may employ a chip ceramic capacitor as a capacitor C27 in the converter 27. The time division signals S1 to S3 are provided as illustrated in FIG. 2(a) to turn on/off the drivers 12 to 14 and carry out a PWM (Pulse Width Modulation) dimming operation that passes and stops currents to the LEDs 21 to 26 as illustrated in FIG. 2(b).

At this time, an output voltage from the converter 27 fluctuates (decreases), and when the LEDs 21 to 26 turn on, the converter 27 causes a voltage drop as illustrated in FIG. 2(c). The voltage drop is compensated by rapidly charging the capacitor C27. This, however, causes the capacitor C27 to generate noise.

An output voltage from the converter 27 during an OFF period of the LEDs 21 to 26, i.e., an OFF period of the drivers 12 to 14 is determined by the IF-VF characteristics of the LEDs 21 to 26. If bias currents are small, the output voltage from the converter 27 during an OFF period of the PWM dimming operation will be lower than that during an ON period thereof, and therefore, the PWM dimming operation fluctuates the output voltage of the converter 27. As results, the capacitor C27 produces noise.

If the apparatus of FIG. 1 is not provided with the bypass units 15 to 17, an output voltage from the converter 27 during an OFF period of the LEDs 21 to 26, i.e., an OFF period of the drivers 12 to 14 jumps as illustrated in FIG. 3(c) because of the no-load condition. This high-voltage output from the converter 27 during an OFF period of the PWM dimming operation raises a risk of destroying the apparatus.

The present invention provides an apparatus for lighting LEDs that produces no noise during a PWM dimming operation, is low-profile, and is manufacturable at low cost.

According to a first aspect of the present invention, the apparatus for lighting LEDs includes an LED group load the LEDs; a converter configured to generate a voltage applied to the LED group load; a current controller configured to control a current passing through the LED group load; a voltage controller configured to control an output voltage provided by the converter; a time division circuit configured to intermittently provide a current to the LED group load; and a selector. The selector is configured to, during a period in which the time division circuit passes a current through the LED group load, select the current controller to control a current passing through the LED group load and thereby control an output voltage provided by the converter, and during a period in which the time division circuit passes no current through the LED group load, select the voltage controller to control an output voltage provided by the converter.

According to a second aspect of the present invention, the current controller generates a current feedback signal according to a current passing through the LED group load and the voltage controller generates a voltage feedback signal according to an output voltage from the converter. The selector, during the period in which the time division circuit passes a current through the LED group load, selects the current feedback signal to PWM-control an output voltage provided by the converter, and during the period in which the time division circuit passes no current through the LED group load, selects the voltage feedback signal to PWM-control an output voltage provided by the converter.

BRIEF DESCRIPTION OF THE DRAWINGS

FIG. 5 is a timing chart illustrating operation of the apparatus of FIG. 4.

DESCRIPTION OF THE PREFERRED EMBODIMENT

An apparatus for lighting LEDs according to an embodiment of the present invention will be explained.

Figure 1:
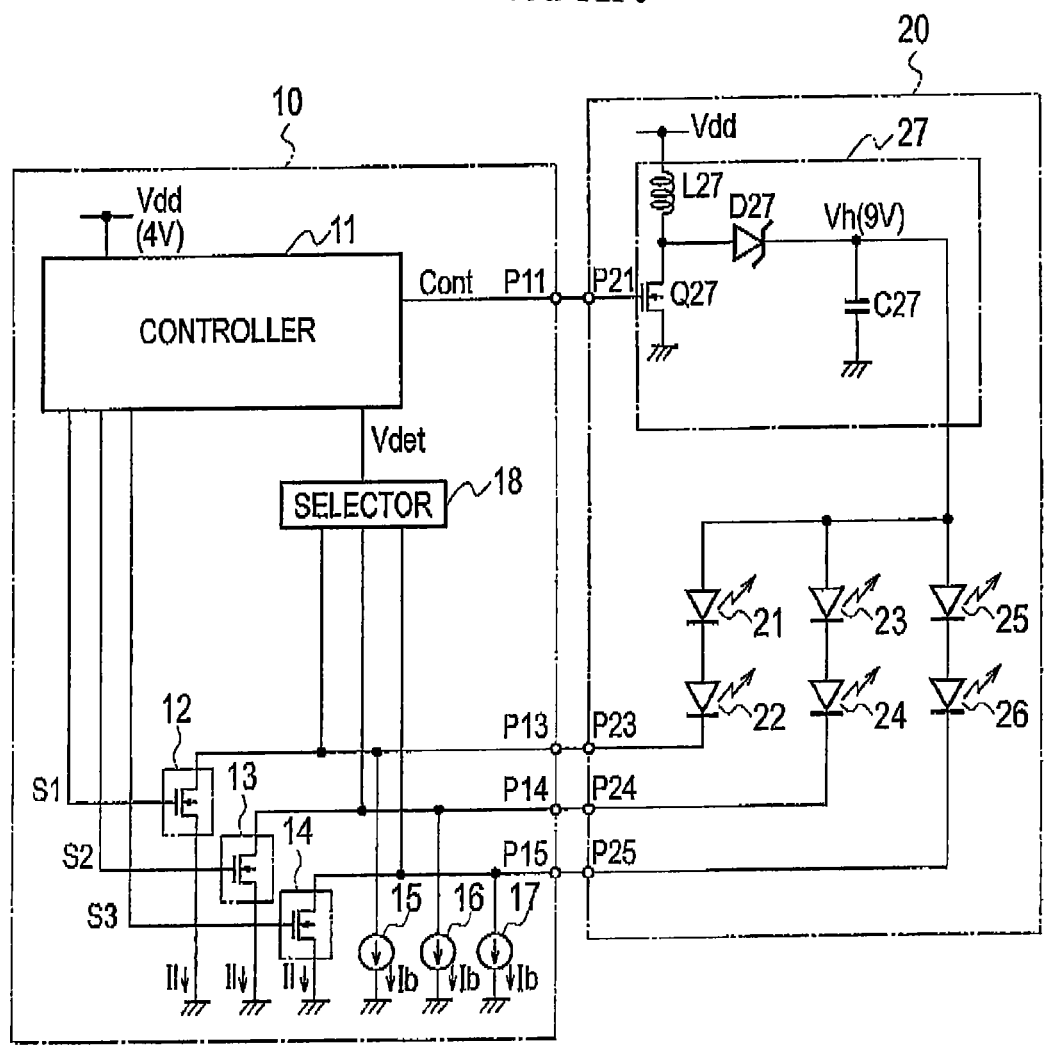
FIG. 1 is a block diagram illustrating an apparatus for lighting LEDs according to a related art.
Figure 2:
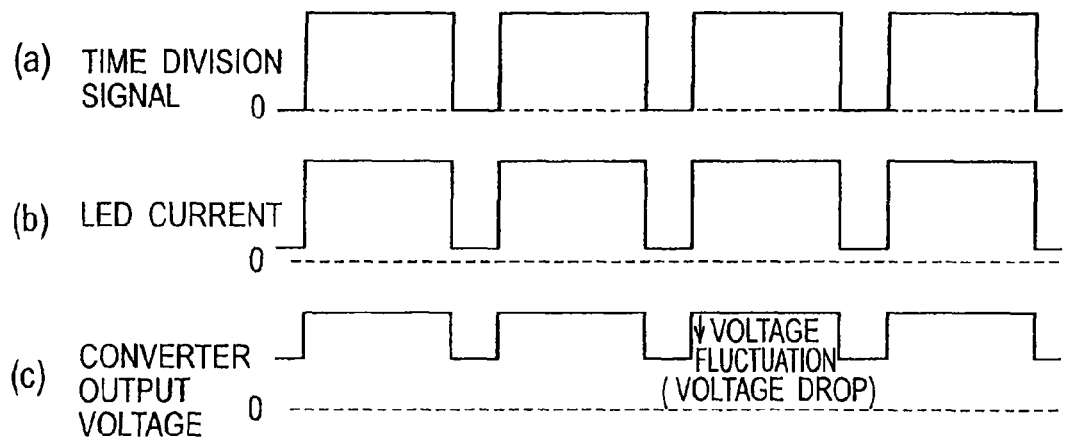
FIG. 2 is a timing chart illustrating operation of the apparatus of FIG. 1.
Figure 3:
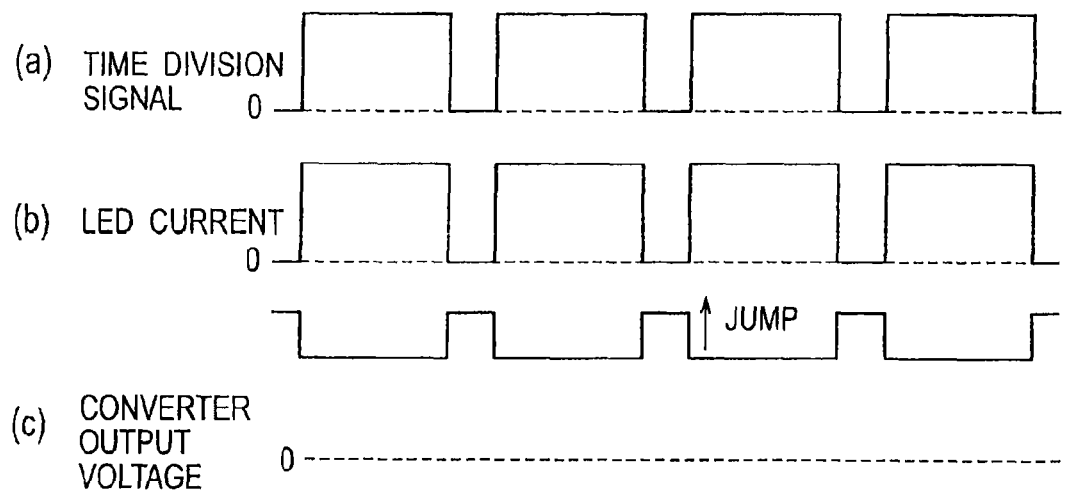
FIG. 3 is a timing chart illustrating operating of an apparatus for lighting LEDs according to another related art.
Figure 4:
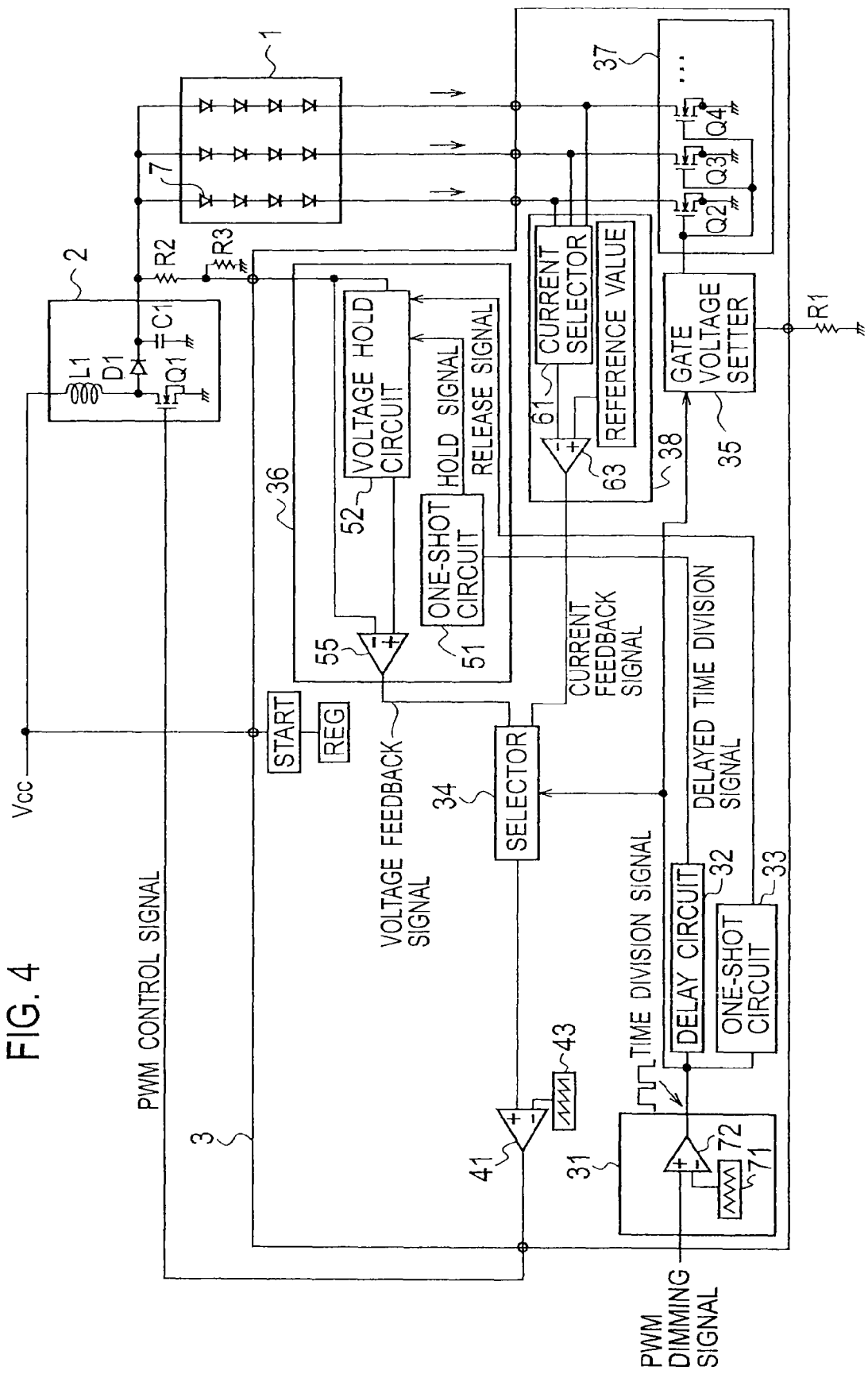
FIG. 4 is a block diagram illustrating an apparatus for lighting LEDs according to an embodiment of the present invention.

FIG. 4 is a block diagram illustrating the apparatus according to the embodiment. The apparatus includes an LED group load 1, a converter 2, a controller 3, and a resistor R1 for setting gate voltage.

The LED group load 1 includes a plurality of LEDs 7 to form a backlight 1. The LEDs 7 are separated into LED groups each having a plurality of series-connected LEDs. The LED groups are connected in parallel with one another. In FIG. 4, there are three LED groups those are connected in parallel with one another. The number of LED groups to be connected in parallel is optional. The LED group load 1 is connected between an output end of the converter 2 and a sink driver 37 arranged in the controller 3.

The converter 2 is, for example, a boost chopper and includes a step-up reactor L1, a switching element Q1 made of a MOSFET, a diode D1, and a capacitor C1. In response to a PWM control signal from the controller 3, the switching element Q1 turns on/off to provide an output voltage. The output voltage from the converter 2 is applied to anodes of the LED group load 1.

The controller 3 includes a time division circuit 31, a delay circuit 32, a one-shot circuit 33, a selector 34, a gate voltage setter 35, a voltage controller 36, the sink driver 37, a current controller 38, a PWM control comparator 41, and a sawtooth signal generator 43.

The time division circuit 31 generates a time division signal that turns on/off at a duty ratio determined by an external DC PWM dimming signal. The time division circuit 31 includes a triangular signal generator 71 and a PWM dimming comparator 72. The triangular signal generator 71 generates a triangular signal and sends the signal to the PWM dimming comparator 72. The PWM dimming comparator 72 has a non-inverting input terminal (depicted by "+") to receive the external PWM dimming signal and an inverting input terminal (depicted by "−") to receive the triangular signal from the triangular signal generator 71. The comparator 72 compares the received signals with each other and provides a rectangular time division signal. The time division signal is sent to the delay circuit 32, one-shot circuit 33, selector 34, and gate voltage setter 35, to turn on/off a gate signal supplied from the gate voltage setter 35 to the sink driver 37.

The delay circuit 32 delays the time division signal from the time division circuit 31 by a predetermined time and supplies the delayed time division signal to the voltage controller 36.

The one-shot circuit 33 generates a pulse signal having a predetermined width in response to a rise edge of the time division signal from the time division circuit 31. The pulse signal is sent as a release signal to the voltage controller 36.

The gate voltage setter 35 generates a gate signal according to the time division signal from the time division circuit 31 and a voltage set by the resistor R1 for setting gate voltage. The gate signal is sent to the sink driver 37.

The sink driver 37 consists of a plurality of, for example, MOSFETs. The number of the MOSFETs is equal to the number of LED lines, i.e., the number of the series-connected LED groups. Gates of the MOSFETs are connected to the gate voltage setter 35, drains thereof are connected to cathodes of the LED group load 1, and sources thereof are grounded.

In an ON period of the time division signal, the MOSFETs in the sink driver 37 turn on in response to the gate signal from the gate voltage setter 35, to pass a current corresponding to the gate signal to the LED group load 1 and light the LEDs. In an OFF period of the time division signal, the MOSFETs in the sink driver 37 turn OFF in response to the gate signal from the gate voltage setter 35, to stop the current passing through the LED group load 1 and turn off the LEDs.

In this way, the brightness of the LED group load 1 is adjusted according to a duty ratio, i.e., an ON/OFF ratio of the time division circuit 31, or the external DC PWM dimming signal.

Currents passing through the three lines of the LED group load 1 or voltages of the three lines of the LED group load 1 during an ON period of the time division signal are not completely equal to one another because the LEDs have different VF characteristics and the MOSFETs of the sink driver 37 demonstrate the Early effect.

The current controller 38 detects each current of three lines passing through the LED group load 1 and the sink driver 37 and generates current detected signals representative of current of the three lines. A current selector 61 receives the three current detected signals, selects one of the signals, and sends the selected signal to an error amplifier 63.

The current selector 61 may select a largest one or a smallest one from among the three current detected signals.

Alternatively, the current detector 38 may detect drain voltages of the MOSFETs in the sink driver 37, generate indirect current detected signals corresponding to the drain voltages, and select one of the indirect current detected signals.

The error amplifier 63 has an inverting input terminal (depicted by "−") to receive the voltage from the current selector 61 and a non-inverting terminal (depicted by "+") to receive a reference voltage. The error amplifier 63 amplifies an error between the received voltages and sends the amplified voltage as a current feedback signal to the selector 34.

The output voltage of the converter 2 is divided by resistors R2 and R3 and the divided voltage is supplied to the voltage controller 36. The voltage controller 36 also receives the delayed time division signal from the delay circuit 32 and the release signal from the one-shot circuit 33. According to these signals, the voltage controller 36 generates a voltage feedback signal and sends the same to the selector 34. The details of the voltage controller 36 will be explained later.

According to the time division signal from the time division circuit 31, the selector 34 selects one of the current feedback signal from the current controller 38 and the voltage feedback signal from the voltage controller 36 and sends the selected signal to the PWM control comparator 41.

The sawtooth signal generator 43 generates a sawtooth signal and sends the same to the PWM control comparator 41. The PWM control comparator 41 compares the current feedback signal or the voltage feedback signal from the selector 34 with the sawtooth signal from the sawtooth signal generator 43, generates a rectangular PWM control signal, and sends the PWM control signal to the gate of the switching element Q1 of the converter 2.

The voltage controller 36 will be explained in detail. The voltage controller 36 includes a one-shot circuit 51, a voltage hold circuit 52, and a voltage control amplifier 55.

The one-shot circuit 51 generates a pulse signal having a predetermined width in response to a rise edge of the delayed time division signal from the delay circuit 32 and sends the pulse signal as a hold signal to the voltage hold circuit 52.

The voltage hold circuit 52 functions to hold a voltage from the converter 2 when a current is passing through the LED group load 1. In response to the hold signal from the one-shot circuit 51, the voltage hold circuit 52 holds an output voltage from the converter 2, and in response to the release signal from the one-shot circuit 33, stops holding the output voltage. The voltage held by the voltage hold circuit 52 is sent to the voltage control amplifier 55.

The voltage control amplifier 55 has a non-inverting input terminal (depicted by "+") to receive the voltage from the voltage hold circuit 52 and an inverting input terminal (depicted by "−") to receive a voltage from the converter 2. The voltage control amplifier 55 amplifies a difference between the received voltages and sends the amplified difference as the voltage feedback signal to the selector 34.

Operation of the apparatus for lighting LEDs according to the embodiment will be explained with reference to the timing chart of FIG. 5.

Receiving an external PWM dimming signal, the time division circuit 31 generates a time division signal illustrated in FIG. 5(a) that turns on/off according to the magnitude (voltage level) of the PWM dimming signal and sends the time division signal to the delay circuit 32, one-shot circuit 33, selector 34, and gate voltage setter 35.

The gate voltage setter 35 generates a gate signal according to the time division signal and a voltage generated by the resistor R1 for setting gate voltage and sends the gate signal to the sink driver 37. According to the gate signal, the MOSFETs in the sink driver 37 turn on/off to pass an LED current illustrated in FIG. 5(c) from the LED group load 1 to the sink driver 37.

The current selector 61 in the current controller 38 detects the current passing through the LED group load 1 and the sink driver 37 and the error amplifier 63 generates a current feedback signal illustrated in FIG. 5(d) that is high during a period in which no LED current passes. The current feedback signal is sent to the selector 34.

The delay circuit 32 delays the time division signal from the time division circuit 31 by a predetermined time, to provide the voltage controller 36 with a delayed time division signal illustrated in FIG. 5(b).

The one-shot circuit 33 generates a release signal illustrated in FIG. 5(e) in response to a rise edge of the time division signal from the time division circuit 31. The release signal has a predetermined pulse width and is sent to the voltage controller 36.

In the voltage controller 36, the one-shot circuit 51 generates a hold signal illustrated in FIG. 5(f) in response to a rise edge of the delayed time division signal from the delay circuit 32. The hold signal has a predetermined pulse width and is sent to the voltage hold circuit 52.

The hold circuit 52 holds an output voltage from the converter 2 in response to the hold signal from the one-shot circuit 51 and sends the held output voltage to the voltage control amplifier 55.

The voltage control amplifier 55 has a non-inverting input terminal (depicted by "+") to receive the voltage from the voltage hold circuit 52 and an inverting input terminal (depicted by "−") to receive a voltage from the converter 2. The voltage control amplifier 55 amplifies a difference between the received voltages, to generate a voltage feedback signal illustrated in FIG. 5(g) that is low during a period in which no LED current passes. The voltage feedback signal is sent to the selector 34.

During a period "A" illustrated in FIG. 5 in which the time division signal from the time division circuit 31 is high and a current passes through the LED group load 1, the selector 34 selects the current feedback signal of the period "A" from the current controller 38 and sends the selected signal to the PWM control comparator 41.

In a period "B" illustrated in FIG. 5 in which the time division signal from the time division circuit 31 is low and no current passes through the LED group load 1, the selector 34 selects the voltage feedback signal of the period "A" generated from an output voltage of the converter 2 during the period in which a current passes through the LED group load 1. The selected signal is sent to the PWM control converter 41.

As results, a PWM control signal that is always at a given level irrespective of whether or not a current passes through the LED group load 1 is sent to the switching element Q1 of the converter 2, to keep an output voltage from the converter 2 constant as illustrated in FIG. 5(h).

According to the apparatus for lighting LEDs of the above-mentioned embodiment, an output voltage from the converter 2 is kept constant even when a PWM dimming operation is carried out. The converter 2, therefore, may employ a chip ceramic capacitor as the capacitor C1 without producing noise. Using the chip ceramic capacitor reduces the height and cost of the apparatus.

According to the above-mentioned embodiment, the selector 34 selects one of the current feedback signal from the current controller 38 and the voltage feedback signal from the voltage controller 36 according to the time division signal. Instead, the selector 34 may select one of the current feedback signal and voltage feedback signal according to whether or not the current feedback signal from the current controller 38 is present. This configuration provides the same effect as the above-mentioned embodiment.

The apparatus of the above-mentioned embodiment may additionally employ a shutdown circuit to stop a signal to the switching element Q1 if a current passes through any line in the sink driver 37 during the time division signal is low level. The apparatus may also employ a soft starter that gradually widens the ON width of a signal to the switching element Q1 from zero for a predetermined period from the start of the controller 3 irrespective of the voltage/current feedback signal.

As mentioned above, the apparatus for lighting LEDs according to the embodiment employs the current controller 38 to control a current passing through the LED group load 1, to control an output voltage provided by the converter 2 during a period in which a current passes through the LED group load 1. During a period in which no current passes through the LED group load 1, the apparatus employs the voltage controller 36 to control an output voltage provided by the converter 2, thereby always keeping the output voltage of the converter 2 constant.

This configuration allows a chip ceramic capacitor to be used for the converter 2 without causing noise. Using the chip ceramic capacitor reduces the height and cost of the apparatus for lighting LEDs.

The present invention is applicable to backlights of liquid crystal displays in personal computers and television sets.

This application claims benefit of priority under 35USC §119 to Japanese Patent Application No. 2008-223373, filed on Sep. 1, 2008, the entire content of which is incorporated by reference herein. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. An apparatus for lighting LEDs comprising:
an LED group load having the LEDs;
a converter configured to generate a voltage applied to the LED group load;
a current controller configured to control a current passing through the LED group load, wherein the current controller generates a current feedback signal according to a current passing through the LED group load;
a voltage controller configured to control an output voltage provided by the converter wherein the voltage controller generates a voltage feedback signal according to an output voltage from the converter;

a time division circuit configured to intermittently provide a current to the LED group load; and a selector configured to:

during a period in which the time division circuit passes a current through the LED group load, select the current controller to control a current passing through the LED group load and thereby control an output voltage provided by the converter, and select the current feedback signal to PWM-control an output voltage provided by the converter; and during a period in which the time division circuit passes no current through the LED group load, select the voltage controller to control an output voltage provided by the converter, and select the voltage feedback signal to PWM-control an output voltage provided by the converter.

2. The apparatus of claim 1, wherein the selector selects one of the current feedback signal and voltage feedback signal according to a time division signal generated by the time division circuit.

3. The apparatus of claim 1, wherein the selector selects one of the current feedback signal and voltage feedback signal according to whether or not the current feedback signal is present.

4. The apparatus of claim 1, further comprising an error amplifier configured to amplify a difference between an output voltage that is provided by the converter and is held while a current is passing through the LED group load and an output voltage that is provided by the converter while no current is passing through the LED group load and provide the amplified difference as the voltage feedback signal for the period in which no current passes through the LED group load.

* * * * *